(12) United States Patent
Lin

(10) Patent No.: US 10,614,608 B2
(45) Date of Patent: Apr. 7, 2020

(54) ELECTRONIC DEVICE FOR IMPLEMENTING METHOD FOR PRODUCING ANIMATED FACE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jung-Yi Lin, New Taipei (TW)

(73) Assignees: Fu Tai Hua Industry (Shenzhen) Co., Ltd., Shenzhen (CN); HON HAI PRECISION INDUSTRY Co., LTD., New Taipei (TW)

( * ) Notice: Subject to any disclaimer, the term of this patent is extended or adjusted under 35 U.S.C. 154(b) by 0 days.

(21) Appl. No.: 16/186,285

(22) Filed: Nov. 9, 2018

(65) Prior Publication Data

US 2019/0378317 A1 Dec. 12, 2019

(30) Foreign Application Priority Data

Jun. 7, 2018 (CN) .......................... 2018 1 0582444

(51) Int. Cl.
G06T 13/80 (2011.01)
G06K 9/00 (2006.01)

(52) U.S. Cl.
CPC .......... *G06T 13/80* (2013.01); *G06K 9/00248* (2013.01); *G06K 9/00281* (2013.01)

(58) Field of Classification Search
None
See application file for complete search history.

(56) References Cited

U.S. PATENT DOCUMENTS

| | | | | |
|---|---|---|---|---|
| 8,055,067 B2* | 11/2011 | Petrescu | ................ | G06K 9/00 382/115 |
| 8,433,107 B1* | 4/2013 | Zhang | ................ | G06K 9/00281 345/581 |
| 9,053,524 B2* | 6/2015 | Florea | ................ | G06K 9/00221 |
| 9,118,876 B2* | 8/2015 | Felt | ................ | A45D 44/005 |
| 9,922,452 B2* | 3/2018 | Son | ................ | G06K 9/00208 |
| 10,354,124 B2* | 7/2019 | Lee | ................ | H04N 1/628 |
| 2004/0170337 A1* | 9/2004 | Simon | ................ | G06K 9/00234 382/254 |
| 2007/0047761 A1* | 3/2007 | Wasilunas | ................ | A45D 44/005 382/100 |
| 2007/0291999 A1* | 12/2007 | Ito | ................ | G06K 9/4647 382/118 |
| 2010/0026831 A1* | 2/2010 | Ciuc | ................ | G06K 9/00221 348/222.1 |
| 2013/0169827 A1* | 7/2013 | Santos | ................ | H04N 5/23229 348/207.1 |

* cited by examiner

*Primary Examiner* — Nurun N Flora
(74) *Attorney, Agent, or Firm* — ScienBiziP, P.C.

(57) ABSTRACT

An electronic device includes a display screen, a processor, and a memory. The processor is configured to obtain attributive information of a facial image, divide the facial image into different attributive portions according to the attributive information, calculate a surface area of each attributive area, determine whether any one of the attributive areas is a distorted area, arrange the attributive areas, when one of the attributive areas is a distorted area, according to a degree of distortion from a largest degree of distortion to a smallest degree of distortion, and process a preset number of the attributive areas having the largest degree of distortion.

20 Claims, 4 Drawing Sheets

ELECTRONIC DEVICE FOR IMPLEMENTING METHOD FOR PRODUCING ANIMATED FACE

FIELD

The subject matter herein generally relates to animation technology, and more particularly to an electronic device implementing a method for producing an animated face from a facial image.

BACKGROUND

In the art of animation, using a facial image as a basis for processing by a computing device is of increasing interest.

BRIEF DESCRIPTION OF THE DRAWINGS

Implementations of the present disclosure will now be described, by way of example only, with reference to the attached figures.

DETAILED DESCRIPTION

Figure 1:
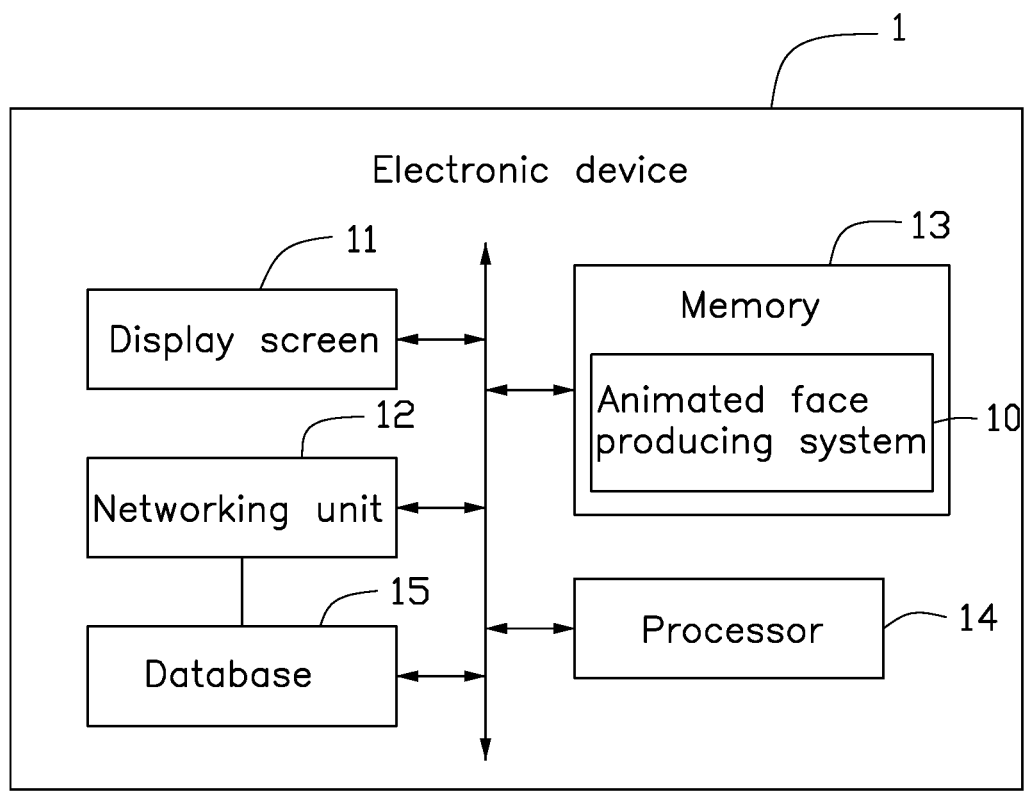
FIG. 1 is a block diagram of an embodiment of an electronic device in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an animated face producing system 10 implemented in an electronic device 1. The electronic device 1 includes, but is not limited to, a display screen 11, a networking unit 12, a memory 13, and a processor 14. The display screen 11, the networking unit 12, the memory 13, and the processor 14 are mutually electrically coupled together. FIG. 1 does not illustrate every component of the electronic device 1, and that the electronic device 1 may include other components, such as a circuit board, a sound system, an input/output port, a battery, an operating system, and the like. The electronic device 1 may be, but is not limited to, a mobile phone, a tablet computer, a desktop computer, or an all-in-one device.

In at least one embodiment, the display screen 11 may include touch response functionality and may be a liquid crystal display or an organic light-emitting diode. The display screen 11 displays image data.

In at least one embodiment, the memory 13 stores a plurality of software instructions of the electronic device 1. The memory 13 may be an internal memory of the electronic device 1, such as a hard disk. The memory 13 may include, but is not limited to, a read-only memory, a random access memory, a programmable read-only memory, an erasable programmable read-only memory, a one-time programmable read-only memory, an electrically-erasable programmable read-only memory, an electrically-erasable programmable read-only memory, a compact disc read-only memory, or other optical storage disk, magnetic storage disc, or magnetic storage tape.

In at least one embodiment, the memory 13 stores the animated face producing system 10. The animated face producing system 10 compares a surface area of each of a plurality of attributive areas of a facial image to an average surface area of the attributive area to determine whether the attributive area is distorted. When the attributive area is distorted, the attributive areas are arranged according to a degree of distortion from a largest degree of distortion to a smallest degree of distortion, and a preset number of the attributive areas having the largest degree of distortion are processed. The processed facial image is then outputted to obtain an animated face.

The processor 14 may be a central processing unit, a microprocessing unit, or other data processing chip. The memory 13 can store the animated face producing system 10, and the animated face producing system 10 can be executed by the processor 14. In another embodiment, the animated face producing system 10 can be embedded in the processor 14. The animated face producing system 10 can be divided into a plurality of modules, which can include one or more software programs in the form of computerized codes stored in the memory 13. The computerized codes can include instructions executed by the processor 14 to provide functions for the modules.

In at least one embodiment, the electronic device 1 further includes a database 15 configured to store a plurality of facial images. The average surface area of each attributive area is calculated according to the plurality of facial images saved in the database 15. Because of variation in position of a face in each facial image and variation in image size of the facial images, the plurality of facial images stored in the database 15 are required to be normalized. Normalization of the facial images includes translation, zoom-in, zoom-out, and rotation of the facial images to ensure a high degree of normalization.

The average surface area of each attributive area is calculated according to the total number of facial images stored in the database 15. For example, if the database 15 stores one million facial images, then the average surface area of each attributive area is calculated according to the measured surface areas of each attributive area of one million facial images. An example of an attributive area is the eyes of the facial image. In this case, the average surface area of the eyes is calculated according to the measured surface area of the eyes of the one million facial images.

Figure 2:
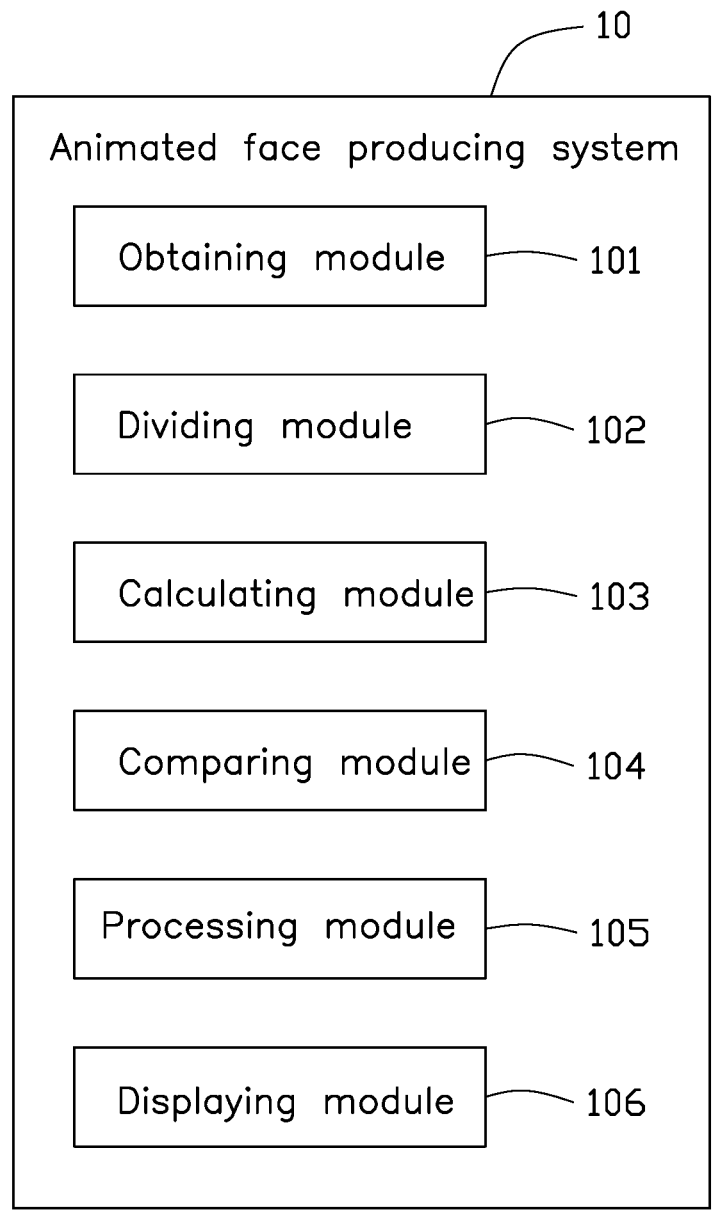
FIG. 2 is a block diagram of function modules of an animated face producing system implemented by the electronic device in FIG. 1.

FIG. 2 illustrates the animated face producing system 10 being divided into a plurality of modules, such as an obtaining module 101, a dividing module 102, a calculating module 103, a comparing module 104, a processing module 105, and a displaying module 106. The modules 101-106 can include one or more software programs in the form of computerized codes stored in the memory 13. The computerized codes can include instructions executed by the processor 14 to provide functions for the modules 101-106.

The obtaining module 101 obtains a facial image of a user.

In at least one embodiment, the obtaining module 101 obtains the facial image of a user through a video captured by a camera (not shown in figures). The obtaining module 101 implements a facial image detection algorithm to detect each frame of the video to determine whether a face appears in the video. When a face appears in the video, the obtaining module 101 saves the frame of the video to obtain the facial image. The obtaining module 101 can further capture still images and detect whether a face appears in the still images to obtain the facial image.

The facial image detection algorithm can be at least one of the following: a sample face detection method, an artificial neural network face detection method, a model face detection method, a skin color face detection method, or a characteristic face detection method.

The obtaining module 101 pre-processes the facial image. In at least one embodiment, the pre-processing of the facial image includes normalization of geometric characteristics. The normalization of geometric characteristics refers to normalizing the position, angle, and size of the facial image. Since spacing between the eyes of a majority of people are relatively the same, the eyes are often used as a basis for normalization of geometric characteristics.

Figure 4:
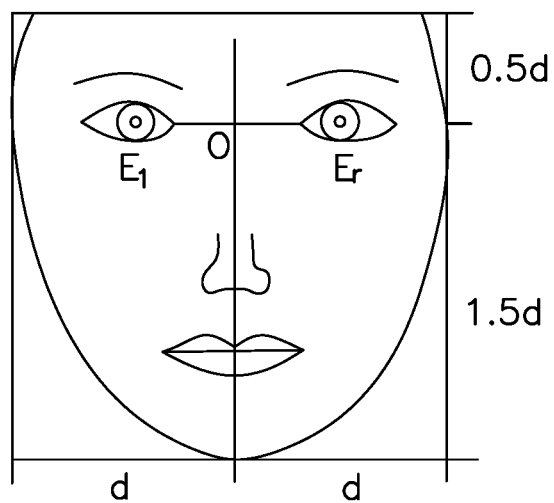
FIG. 4 is a diagram of a facial image processed by the animated face producing system.

For example, positions of the left and right eyes of the facial image are represented as $E_l$ and $E_r$ (shown in FIG. 4), and the normalization of geometric characteristics is accomplished as described below.

A) the facial image is rotated until a line segment $\overline{E_l E_r}$ is horizontal. In this way, a direction of the facial images is normalized.

B) the facial image is cropped according to a predetermined proportion. For example, a point O is a midpoint of line segment $\overline{E_l E_r}$, and $d = \overline{E_l E_r}$. By cropping the facial image having dimensions of 2d×2d, point O is maintained at a position of (0.5d, d). Thus, a position of each facial image is the same and not changed by translation of the facial image in a plane.

C) the cropped facial image is shrunk or enlarged to normalize the size of the facial image. For example, if the size of the facial image is set as 128×128 pixels, such that a distance $d = \overline{E_l E_r}$ is equal to 64 pixels, then a zoom multiple is defined as $\beta = 2d/128$ Thus, the sizes of the facial images are made the same, and a dimension of the facial image is not changed within a plane.

The obtaining module 101 obtains attributive data of the processed facial images.

In at least one embodiment, the obtaining module 101 uses a characteristic face detection algorithm to obtain the attributive data. The attributive data includes data of the eyes, nose, mouth, eyebrows, and cheeks.

In another embodiment, the characteristic data further includes data of the cheek bones, philtrum, moles, and ears.

In at least one embodiment, the characteristic face detection algorithm may be at least one of the following: Gabor characteristics, histogram of oriented gradient, local binary patterns, principal component analysis, linear discriminant analysis, or independent component analysis.

In at least one embodiment, the facial detection algorithm and the characteristic face detection algorithm are not limited to the ones described above. Any facial algorithm for detecting facial areas and facial characteristics may be used. Facial detection and facial characteristic detection algorithms are known in the art and will not be described further.

The dividing module 102 divides the processed facial image into a plurality of attributive areas according to the characteristic data. In at least one embodiment, the dividing module 102 divides the processed facial image into an eyes area, a mouth area, an eyebrow area, a cheek area, a cheekbone area, and an ears area.

The calculating module 103 calculates a surface area of the attributive areas. In at least one embodiment, the calculating module 103 can first calculate the pixels of the attributive areas of the processed facial image, and then calculate the surface area of the attributive areas according to the size dimensions of the pixels.

The comparing module 104 compares the surface area of the attributive areas to the average surface area of the attributive areas to determine whether any of the attributive areas is distorted.

In at least one embodiment, the average surface area of the attributive areas is stored in the database 15.

The comparing module 104 determines that the attributive area is distorted when the surface area and the average surface area have an absolute value difference greater than or equal to a predetermined amount. The comparing module 104 determines that the attributive area is not distorted when the surface area and the average surface area have an absolute value difference less than the predetermined amount.

For example, if the surface area of the eyes and the average surface area of the eyes stored in the database 15 have an absolute value difference greater than or equal to the predetermined amount, then the comparing module 104 determines that the eyes are distorted.

The processing module 105 arranges the plurality of attributive areas according to a degree of distortion from a largest degree of distortion to a smallest degree of distortion, and selects a preset number of the attributive areas having a highest degree of distortion.

In at least one embodiment, the degree of distortion refers to the absolute value difference between the surface area and the average surface area.

The processing module 105 processes the preset number of attributive areas having the highest degree of distortion. The other attributive areas are not processed.

In at least one embodiment, the attributive areas are processed by enlarging, shrinking, and deforming and exaggerating processing.

The display module 106 outputs the processed facial images on the display screen 11.

Figure 3:
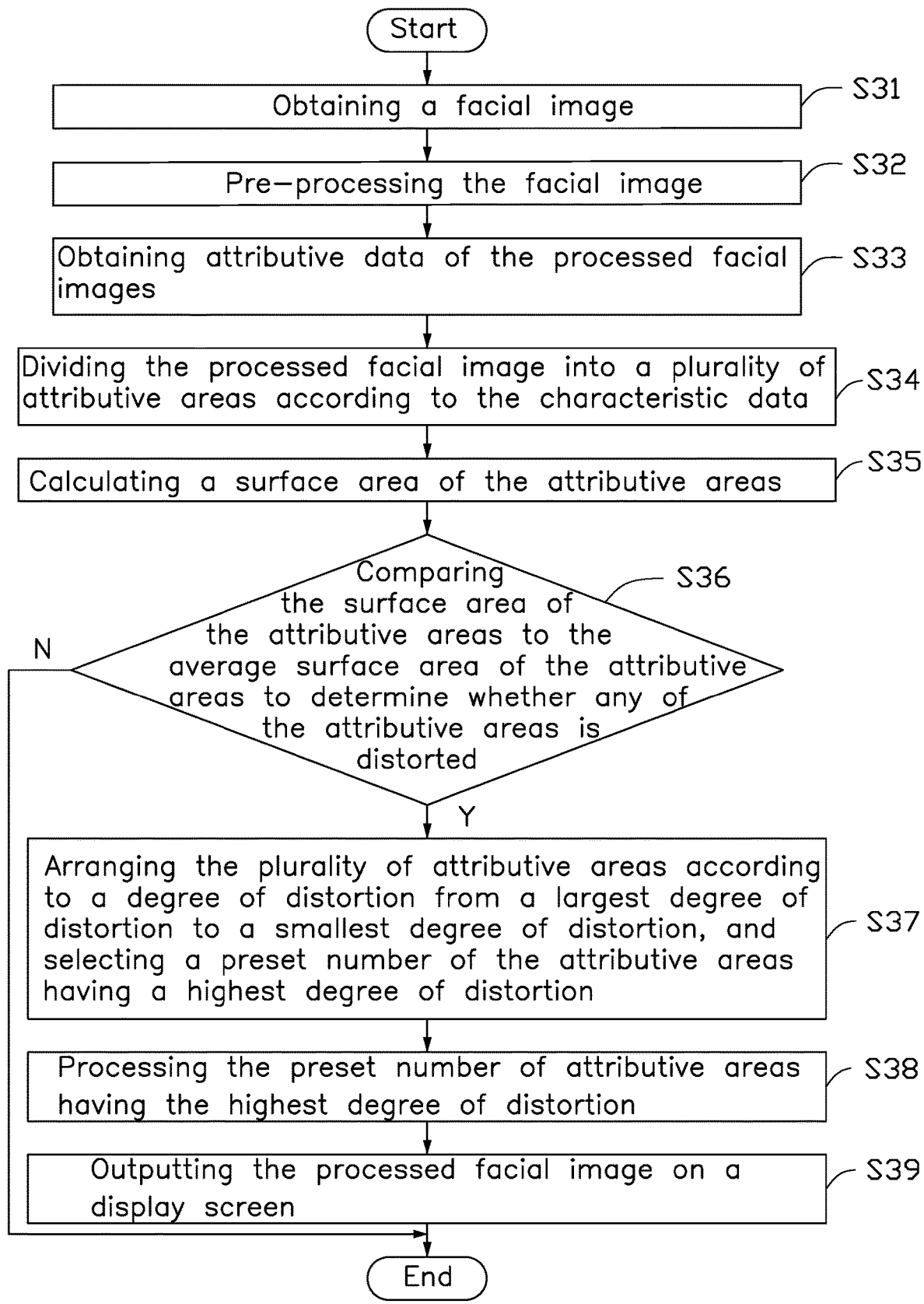
FIG. 3 is a flowchart of a diagram for producing an animated face.

FIG. 3 illustrates a flowchart of an exemplary method for providing an animated face. The example method is provided by way of example, as there are a variety of ways to carry out the method. The method described below can be carried out using the configurations illustrated in FIGS. 1-2 and 4, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S31.

At block S31, the obtaining module obtains the facial image.

In at least one embodiment, the obtaining module 101 obtains the facial image of a user through a video captured by a camera (not shown in figures). The obtaining module 101 implements a facial image detection algorithm to detect each frame of the video to determine whether a face appears in the video. When a face appears in the video, the obtaining module 101 saves the frame of the video to obtain the facial image. The obtaining module 101 can further capture still images and detect whether a face appears in the still images to obtain the facial image.

The facial image detection algorithm can be at least one of the following: a sample face detection method, an artificial neural network face detection method, a model face detection method, a skin color face detection method, or a characteristic face detection method.

At block S32, the obtaining module 101 pre-processes the facial image. In at least one embodiment, the pre-processing of the facial image includes normalization of geometric characteristics. The normalization of geometric characteristics refers to normalizing the position, angle, and size of the facial image. Since spacing between the eyes of a majority of people are relatively the same, the eyes are often used as a basis for normalization of geometric characteristics.

For example, positions of the left and right eyes of the facial image are represented as $E_l$ and $E_r$ (shown in FIG. 4), and the normalization of geometric characteristics is accomplished as described below.

A) the facial image is rotated until a line segment $\overline{E_l E_r}$ is horizontal. In this way, a direction of the facial images is normalized.

B) the facial image is cropped according to a predetermined proportion. For example, a point O is a midpoint of line segment $\overline{E_l E_r}$, and $d = \overline{E_l E_r}$. By cropping the facial image having dimensions of 2d×2d, point O is maintained at a position of (0.5d, d). Thus, a position of each facial image is the same and not changed by translation of the facial image in a plane.

C) the cropped facial image is shrunk or enlarged to normalize the size of the facial image. For example, if the size of the facial image is set as 128×128 pixels, such that a distance $d = \overline{E_l E_r}$ equal to 64 pixels, then a zoom multiple is defined as $\beta = 2d/128$. Thus, the sizes of the facial images are made the same, and a dimension of the facial image is not changed within a plane.

At block S33, the obtaining module 101 obtains attributive data of the processed facial images.

In at least one embodiment, the obtaining module 101 uses a characteristic face detection algorithm to obtain the attributive data. The attributive data includes data of the eyes, nose, mouth, eyebrows, and cheeks.

In another embodiment, the characteristic data further includes data of the cheek bones, philtrum, moles, and ears.

In at least one embodiment, the characteristic face detection algorithm may be at least one of the following: Gabor characteristics, histogram of oriented gradient, local binary patterns, principal component analysis, linear discriminant analysis, or independent component analysis.

At block S34, the dividing module 102 divides the processed facial image into a plurality of attributive areas according to the characteristic data. In at least one embodiment, the dividing module 102 divides the processed facial image into an eyes area, a mouth area, an eyebrow area, a cheek area, a cheekbone area, and an ears area.

At block S35, the calculating module 103 calculates a surface area of the attributive areas. In at least one embodiment, the calculating module 103 can first calculate the pixels of the attributive areas of the processed facial image, and then calculate the surface area of the attributive areas according to the size dimensions of the pixels.

At block S36, the comparing module 104 compares the surface area of the attributive areas to the average surface area of the attributive areas to determine whether any of the attributive areas is distorted.

When the surface area and the average surface area have an absolute value difference greater than or equal to a predetermined amount, the comparing module 104 determines that the attributive area is distorted, and block S37 is implemented. When the surface area and the average surface area have an absolute value difference less than the predetermined amount, the comparing module 104 determines that the attributive area is not distorted, and the method ends.

At block S37, the processing module 105 arranges the plurality of attributive areas according to a degree of distortion from a largest degree of distortion to a smallest degree of distortion, and selects a preset number of the attributive areas having a highest degree of distortion. For example, the processing module 105 selects two attributive areas having the highest degree of distortion.

In at least one embodiment, the degree of distortion refers to the absolute value difference between the surface area and the average surface area.

At block S38, the processing module 105 processes the preset number of attributive areas having the highest degree of distortion.

In at least one embodiment, the attributive areas are processed by enlarging, shrinking, and deforming and exaggerating processing.

At block S39, the displaying module 106 outputs the processed facial image on the display screen 11.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for producing an animated face implemented in an electronic device, the method comprising:
   obtaining attributive information of a facial image;

dividing the facial image into a plurality of different attributive areas according to the attributive information;

calculating a surface area of each attributive area;

determining whether any one of the attributive areas is a distorted area;

arranging the plurality of attributive areas, when one of the attributive areas is a distorted area, according to a degree of distortion from a largest degree of distortion to a smallest degree of distortion; and processing a preset number of the attributive areas having the largest degree of distortion.

2. The method of claim 1, wherein before the attributive information of the facial image is obtained, the facial image is obtained and pre-processed.

3. The method of claim 2, wherein the pre-processing comprises normalization of geometric characteristics.

4. The method of claim 1, wherein processing of the attributive area comprises enlarging, shrinking, and deformation exaggeration processing.

5. The method of claim 1, wherein the attributive area is determined to be distorted by comparing the surface area of the attributive area to an average surface area of the corresponding attributive area; when the surface area of the attributive area and the average surface area of the corresponding attributive area have an absolute value difference greater than a predetermined amount, a characteristic area is determined to be the distorted area; when the surface area of the attributive area and the average surface area of the corresponding attributive area have an absolute value difference less than the predetermined amount, the characteristic area is determined to not be a distorted area.

6. The method of claim 5, wherein the average surface area of each attributive area is calculated according to a plurality of facial images saved in a database of the electronic device.

7. The method of claim 1, wherein the degree of distortion refers to an absolute value difference between the surface area of the attributive area and the average surface area of the corresponding attributive area.

8. The method of claim 1, further comprising outputting the processed facial image on a display screen of the electronic device.

9. An electronic device comprising:
a display screen;
a processor; and
a memory having stored therein a plurality of instruction, which when executed by the processor, cause the processor to:
obtain attributive information of a facial image;
divide the facial image into a plurality of different attributive areas according to the attributive information;
calculate a surface area of each attributive area;
determine whether any one of the attributive areas is a distorted area;
arrange the plurality of attributive areas, when one of the attributive areas is a distorted area, according to a degree of distortion from a largest degree of distortion to a smallest degree of distortion; and
process a preset number of the attributive areas having the largest degree of distortion.

10. The electronic device of claim 9, wherein before the attributive information of the facial image is obtained, the facial image is obtained and pre-processed by normalization of geometric characteristics.

11. The electronic device of claim 9, wherein processing of the attributive area comprises enlarging, shrinking, and deformation exaggeration processing.

12. The electronic device of claim 9, wherein the attributive area is determined to be distorted by comparing the surface area of the attributive area to an average surface area of the corresponding attributive area; when the surface area of the attributive area and the average surface area of the corresponding attributive area have an absolute value difference greater than a predetermined amount, a characteristic area is determined to be the distorted area; when the surface area of the attributive area and the average surface area of the corresponding attributive area have an absolute value difference less than the predetermined amount, the characteristic area is determined to not be a distorted area.

13. The electronic device of claim 12, wherein the average surface area of each attributive area is calculated according to a plurality of facial images saved in a database of the electronic device.

14. The electronic device of claim 9, wherein the processor is further configured to output the processed facial image on the display screen of the electronic device.

15. A non-transitory storage medium having stored thereon instructions that, when executed by at least one processor of an electronic device, causes the at least one processor to execute instructions of a method for producing an animated face, the method comprising:
obtaining attributive information of a facial image;
dividing the facial image into a plurality of different attributive areas according to the attributive information;
calculating a surface area of each attributive area;
determining whether any one of the attributive areas is a distorted area;
arranging the plurality of attributive areas, when one of the attributive areas is a distorted area, according to a degree of distortion from a largest degree of distortion to a smallest degree of distortion; and
processing a preset number of the attributive areas having the largest degree of distortion.

16. The non-transitory storage medium of claim 15, wherein before the attributive information of the facial image is obtained, the facial image is obtained and pre-processed by normalization of geometric characteristics.

17. The non-transitory storage medium of claim 15, wherein processing of the attributive area comprises enlarging, shrinking, and deformation exaggeration processing.

18. The non-transitory storage medium of claim 15, wherein the attributive area is determined to be distorted by comparing the surface area of the attributive area to an average surface area of the corresponding attributive area; when the surface area of the attributive area and the average surface area of the corresponding attributive area have an absolute value difference greater than a predetermined amount, a characteristic area is determined to be the distorted area; when the surface area of the attributive area and the average surface area of the corresponding attributive area have an absolute value difference less than the predetermined amount, the characteristic area is determined to not be a distorted area.

19. The non-transitory storage medium of claim 18, wherein the average surface area of each attributive area is calculated according to a plurality of facial images saved in a database of the electronic device.

20. The non-transitory storage medium of claim 15, wherein the processor is further configured to output the processed facial image on the display screen of the electronic device.

* * * * *